US008064621B2

(12) United States Patent
Terada

(10) Patent No.: US 8,064,621 B2

(45) Date of Patent: Nov. 22, 2011

(54) DIGITAL MIXER

(75) Inventor: Kotaro Terada, Hamamatsu (JP)

(73) Assignee: Yamaha Corporation, Hamamatsu-shi (JP)

( * ) Notice: Subject to any disclaimer, the term of this patent is extended or adjusted under 35 U.S.C. 154(b) by 1379 days.

(21) Appl. No.: 11/514,786

(22) Filed: Aug. 31, 2006

(65) Prior Publication Data

US 2007/0058823 A1 Mar. 15, 2007

(30) Foreign Application Priority Data

Sep. 9, 2005 (JP) ................................ 2005-261806

(51) Int. Cl.
*H04B 1/00* (2006.01)

(52) U.S. Cl. ................ 381/119; 369/3; 369/4; 381/109; 700/94; 84/660; 84/625; 84/697

(58) Field of Classification Search .................. 381/109, 381/119; 369/3-4; 700/94; 84/625, 660, 84/697

See application file for complete search history.

(56) References Cited

U.S. PATENT DOCUMENTS

| | | | | |
|---|---|---|---|---|
| 6,438,241 | B1 * | 8/2002 | Silfvast et al. | 381/119 |
| 7,620,468 | B2 * | 11/2009 | Shimizu | 700/94 |
| 7,765,018 | B2 * | 7/2010 | Hiroi et al. | 700/94 |
| 2005/0019021 | A1 | 1/2005 | Takahashi | |
| 2006/0210098 | A1 * | 9/2006 | Okabayashi et al. | 381/119 |

FOREIGN PATENT DOCUMENTS

| | | |
|---|---|---|
| JP | 2005-45425 | 2/2005 |
| JP | 2005-223603 A | 8/2005 |
| JP | 2006-262079 A | 9/2006 |
| JP | 2006-262080 A | 9/2006 |

OTHER PUBLICATIONS

Notice of Reason for Rejection mailed Nov. 12, 2009, for JP Patent Application No. 2005-261806, with English Translation, four pages.
Notice of Reason for Rejection mailed Nov. 12, 2009, for JP Patent Application No. 2005-261806, with English Translation, four pages.

* cited by examiner

*Primary Examiner* — Devona Faulk
*Assistant Examiner* — Disler Paul
(74) *Attorney, Agent, or Firm* — Morrison & Foerster LLP

(57) ABSTRACT

In a digital mixer, a storage stores operating data including a plurality of parameters for controlling states of audio signals of a plurality of channels. A signal processor performs a mixing process of the audio signals based on the operating data. A plurality of channel strips are mounted on an operating panel in correspondence to the plurality of the channels. Each channel strip includes operators arranged for controlling a corresponding channel. A display controller displays a panel imitation portion imitating an appearance of the operating panel and including a plurality of channel strip imitation images which imitate the plurality of the channel strips and which are arranged in a positional relationship corresponding to a positional relationship of the channel strips arranged on the operating panel. A parameter setter sets a value of a specific parameter of a channel corresponding to a channel strip upon detecting that the channel strip has been manipulated. A display mode setter allows each channel strip imitation image to be displayed in a display mode according to the value of the specific parameter of the corresponding channel.

9 Claims, 12 Drawing Sheets

DIGITAL MIXER

BACKGROUND OF THE INVENTION

1. Technical Field of the Invention

The present invention relates to a digital mixer that is used to mix and adjust audio signals in a concert or recording of musical sound content.

2. Description of the Related Art

Along with the development of digital technologies, recent digital mixers can process audio signals of a large number of input and output channels, and also have a wide range of types of parameters that can be set in each input and output channel. Mounting all individual operators and indicators for setting all the parameters on an operating panel is impractical, because the size of the operating panel would be excessively increased. Thus, in general, a multipurpose display device is mounted on the operating panel, and setting screens (or windows) displayed on the display device are switched to select and set a large number of types of parameters. An assembly of operators and indicators for one channel, which is referred to as a "channel strip", is assigned to each of the input and outputs channels. Since the size of a single channel strip is rather limited, operators used to set parameters that are changed frequently are disposed on the channel strip. For example, an ON/OFF key for setting an ON/OFF state of the channel, a SEL key for setting the channel as a target channel (i.e., a selected channel) for which detailed parameters are to be set in the display, a fader for increasing or decreasing the gain of the channel, and the like are disposed on the channel strip.

A collection of parameters currently applied to the digital mixer is referred to as "current data". Current data can be stored as "scene data" in a specific region of a memory, and existing scene data can also be recalled and overwritten onto the current data. This makes it possible to switch a number of parameters with one touch of a button, for example at the time of changing a stage of a concert hall. In a known technology, when scene recall is performed, all current data is not overwritten with scene data, and a safe parameter which is excluded from the parameters to be overwritten with the scene data, is set for each parameter type. This technology is referred to as a "recall safe function" and one example thereof is described in Patent Reference 1. A parameter associated with this recall safe function is also rarely changed. Therefore, in Patent Reference 1, an operator for setting the recall safe function is not provided in the channel strip and the value of the parameter is set in the above-mentioned multipurpose display.

[Patent Reference 1] Japanese Patent Application Publication No. 2005-045425, and corresponding U.S. Patent Application Publication No. 2005/0019021.

As described above, the multipurpose display or the like must be used to set parameters that are rarely changed. However, in the conventional digital mixer, display states of the setting screen of the display device are not associated with actual setting states of the channel strips, so that it is difficult for the user to intuitively grasp the association between the channel strip and its display image.

SUMMARY OF THE INVENTION

Therefore, the present invention has been made in view of the above problems, and it is an object of the present invention to provide a digital mixer, which allows the user to intuitively grasp the relationship between the image of the setting screen and setting states of the channel strips, thereby achieving a high manipulation efficiency and performance.

In order to solve the above problems, the present invention is characterized by a configuration described below. In accordance with one aspect, the present invention provides a digital mixer having an operating panel, comprising: a storage that stores operating data including a plurality of parameters for controlling states of audio signals of a plurality of channels; a signal processor that performs a mixing process of the audio signals based on the operating data; a display device; a plurality of channel strips that are mounted on the operating panel for a first group of channels, which are at least a part of the plurality of the channels, each of the channel strips including one or more operators arranged thereon for controlling a corresponding channel; a display controller that controls the display device to display a panel imitation portion imitating an appearance of the operating panel and including a plurality of channel strip imitation images which imitate the plurality of the channel strips and which are arranged in a positional relationship corresponding to a positional relationship of the channel strips arranged on the operating panel; a parameter setter that sets a value of a specific parameter of a channel corresponding to a channel strip included in the plurality of the channel strips upon detecting that the channel strip has been manipulated; and a display mode setter that allows each channel strip imitation image to be displayed in a display mode according to the value of the specific parameter of the corresponding channel.

In a preferred form, the channel strips include fixed channel strips to which fixed ones of the channels are fixedly assigned and switched channel strips to which selected ones of the channels are switchably assigned; the plurality of the channels include the first group of the channels fixedly assigned to the fixed channel strips and a second group of channels selectively assigned in units of layers to the switched channel strips; and the panel imitation portion includes a channel display portion which contains channel strip imitation images corresponding to the second group of the channels, and which are arranged vertically in units of layers at positions corresponding to positions of the switched channel strips arranged on the operating panel.

In another preferred form, each of the channel strips includes: a direct operator that has a direct influence on an audio signal of a corresponding channel as the direct operator is operated; and an indirect operator that has no direct influence on an audio signal of a corresponding channel as the indirect operator is operated. The parameter setter sets the value of the specific parameter based on an operating state of the indirect operator. The digital mixer further includes: an operating mode selector for selecting either of on state and off state of a specific operating mode; and a channel selector for selecting a channel that is allowed to set a value of a parameter associated with the specific parameter, based on an operation of the indirect operator. The parameter setter sets the value of the specific parameter based on the operating state of the indirect operator, provided that the specific operating mode is the on state.

Further, the display controller controls the display device to display a parameter display portion together with the panel imitation portion, the parameter display portion displaying at least the specific parameter, and the digital mixer further includes an operator display controller that allows a value of a parameter set by the parameter setter to be reflected in an external appearance of each indirect operator.

In accordance with another aspect, the present invention provides a machine readable medium for use in a digital mixer which comprises: an operating panel; a storage that stores operating data including a plurality of parameters for controlling states of audio signals of a plurality of channels; a signal processor that performs a mixing process of the audio signals based on the operating data; a display device; a plurality of channel strips that are mounted on the operating panel for a first group of channels, which are at least a part of the plurality of the channels, each of the channel strips including one or more operators arranged thereon; and a controller that controls the storage, the signal processor and the channel strips. The inventive medium contains a program executable by the controller for causing the digital mixer to perform: a display control step that allows a panel imitation portion to be displayed on the display device, the panel imitation portion imitating an appearance of the operating panel and including channel strip imitation images which imitate the channel strips and which are arranged in a positional relationship corresponding to a positional relationship of the channel strips arranged on the operating panel; a parameter setting step that sets a value of a specific parameter of a channel corresponding to a channel strip included in the plurality of the channel strips upon detecting that the channel strip has been manipulated; and a display mode setting step that allows each channel strip imitation image to be displayed in a display mode according to the value of the specific parameter of the corresponding channel.

As described above, the panel imitation portion of the display screen includes a plurality of channel strip imitation images that imitate the channel strips and that are arranged in a positional relationship corresponding to a positional relationship in which the channel strips are arranged. In addition, the value of the specific parameter is set based on the operating state of the indirect operator and the set parameter value is reflected in the external appearance of each indirect operator. This allows the user to intuitively grasp the relationship between the visualized setting states shown in the setting screen and the actual setting state of the channel strips, thereby achieving a high manipulation efficiency and performance.

DETAILED DESCRIPTION OF THE INVENTION

1. Hardware Configuration of Embodiment 1.1. Overall Configuration

The configuration of a digital mixer of an embodiment of the present invention will now be described with reference to FIG. 1.

Figure 1:
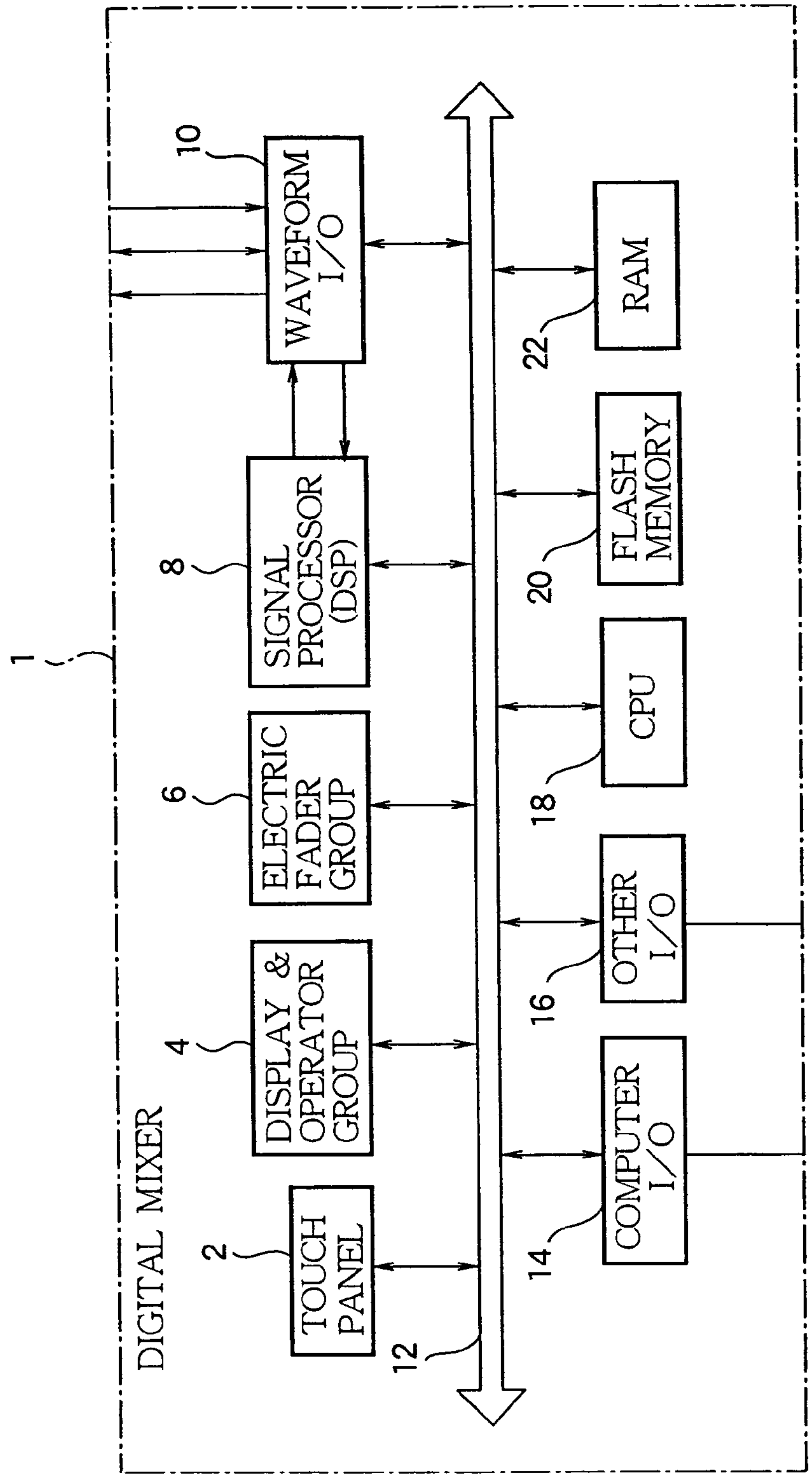
FIG. 1 is a block diagram of a digital mixer according to an embodiment of the present invention.

In FIG. 1, reference numeral "2" denotes a touch panel including a display and a touch screen attached to a surface of the display. The display displays a variety of screens to a user based on display information received through a bus line 12. When the user touches a position on the touch screen with a finger, the touch screen detects the finger and the touched position. The display in the touch panel 2 includes, for example, a flat panel display with a resolution of about "1024×768". Reference numeral "4" denotes an indicator/operator group which includes a variety of knobs, switches, and LED keys disposed on an operating panel 30, which will be described later, at corresponding positions thereof. A blinking state of an LED included in each LED key is set through the bus line 12. Manipulation states of the knobs, the switches, the LED keys, and the like are output through the bus line 12.

Reference numeral "6" denotes a group of electric faders that adjust signal levels of input and output channels based on manipulations of the operators. The electric fader group 6 is designed such that its manipulation positions are automatically set upon receiving manipulation commands through the bus line 12. "10" denotes a waveform I/O unit through which analog or digital audio signals are input and output. In this embodiment, all mixing and effects processes of a variety of audio signals are performed digitally. However, audio signals input from the outside and audio signals to be output to the outside may be either digital or analog. Therefore, the waveform I/O unit 10 performs processes such as conversion between analog and digital signals and conversion between different types of digital signals. "8" denotes a signal processor that includes a group of Digital Signal Processors (DSP). The signal processor 8 performs mixing or effects processes on a digital audio signal received through the waveform I/O unit 10 and outputs results of the process to the waveform I/O unit 10.

Reference numeral "14" denotes a computer I/O unit through which a variety of control information is input from and output to an external computer. "16" denotes another I/O unit through which time code and other information is input from and output to a variety of external devices such as recorders. "18" denotes a CPU that controls each component through the bus line 12 based on a control program described later. "20" denotes a flash memory that stores the control program at a program region therein. "22" denotes a RAM that is used as a work memory of the CPU 18.

In the digital mixer of this embodiment, a variety of parameters (specifically, current data) for controlling current operations are stored in the RAM 22 at a specific region (specifically, a current region). Specifically, values of the current data are updated as the user manipulates the indicator/operator group 4 and the electric fader group 6, and mixing or effects processing of the signal processor 10, a display state of the touch panel 2, blinking states of LEDs in the indicator/operator group 4, and positions of the faders of the electric fader group 6 are controlled based on the current data. The current data can be stored as scene data at a specific region (specifically, a scene region) of the RAM 22 as needed, and scene data stored in the scene region can be recalled to the current region as needed.

1.2. Configuration of Mixing Algorithm

Figure 2:
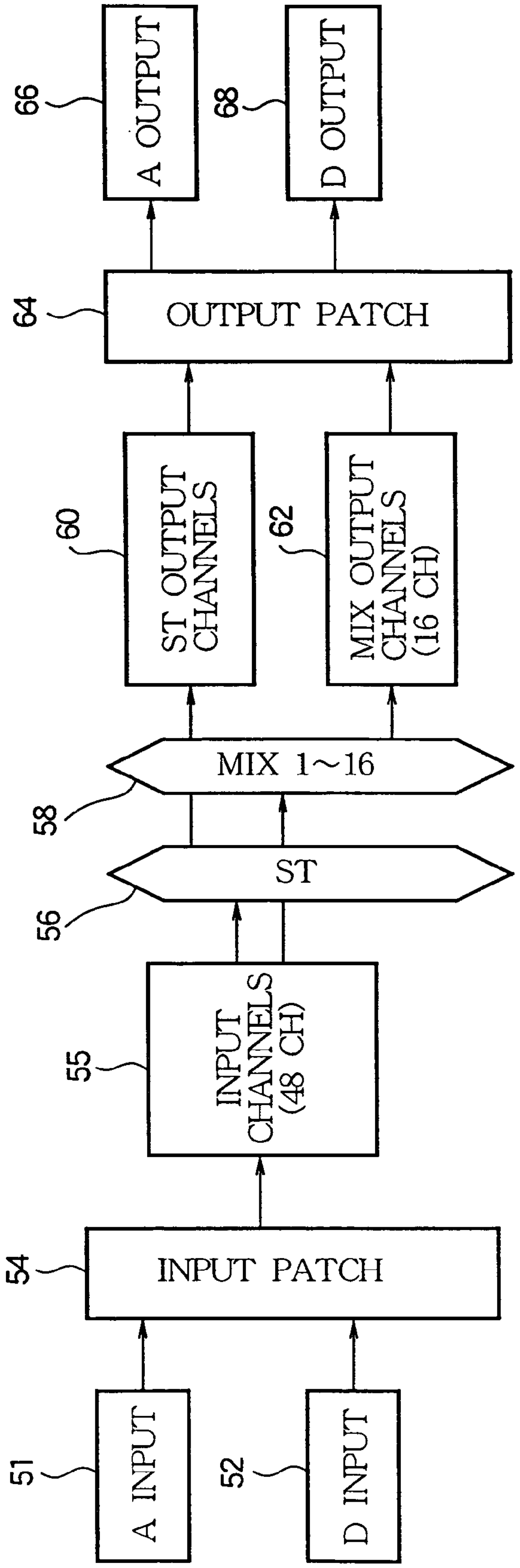
FIG. 2 is a block diagram of an algorithm for the digital mixer.

The configuration of an algorithm realized by the signal processor 8 or the like will now be described with reference to FIG. 2. The algorithm is realized by a program set in the signal processor 8. Under control of the CPU 18, the program is loaded from the flash memory 20 into the signal processor 8. In FIG. 2, reference numeral "51" denotes an analog input unit, which receives and converts an analog audio signal of a microphone or line level to a digital audio signal and provides it to the signal processor 8. "52" denotes a digital input unit, which receives and converts a digital audio signal to an internal format of the signal processor 8. "66" denotes an analog output unit, which converts a digital audio signal provided from the signal processor 8 to an analog audio signal and then outputs the analog audio signal. "68" denotes a digital output unit, which converts a digital audio signal of the internal format provided from the signal processor 8 to a digital audio signal of a specific format (AES/EBU, ADAT, TASCAM, etc.) and then outputs the converted audio signal.

The above components of the signal processor 8 are realized by a waveform I/O unit 10, which is a hardware component separated from the signal processor 8, and a variety of cards inserted therein, whereas the other components thereof are realized by the program run in the signal processor 8. "55" denotes an input channel adjuster, which performs adjustment of audio volume, audio quality, and the like of input channels ("48" channels) based on manipulations of operators such as electric faders and knobs on the operating panel 30. "54" denotes an input patch unit, which assigns digital audio signals provided from a plurality of input ports such as the input units 51 and 52 to input channels of the input channel adjuster 55.

Reference numeral "58" denotes a mix bus group that includes "16" mix buses. Digital audio signals of the input channels provided to each of the mix buses are mixed on the mix bus. Whether or not to provide an audio signal to each mix bus can be set in each input channel. When audio signals are set to be provided to mix buses, a send level, a fade mode (pre or post-fade), and the like of each of the mix buses can also be set independently of each other. "56" denotes a stereo output bus, which includes a "single" stereo output bus 56. The stereo output bus 56 has the same configuration as the mix bus. However, a "single" stereo audio signal includes "two" (left and right) audio signals. "60" denotes a stereo output channel unit, which performs adjustment of the level and audio quality of a mixed signal on the stereo output bus 56. "62" denotes a mix output channel unit, which performs adjustment of the level and audio quality of a mixed signal on each of the mix buses. "64" denotes an output patch unit, which assigns output signals of the stereo output channel unit 60 and the mix output channel unit 62 to ports of the output units 66 and 68.

Figure 3:
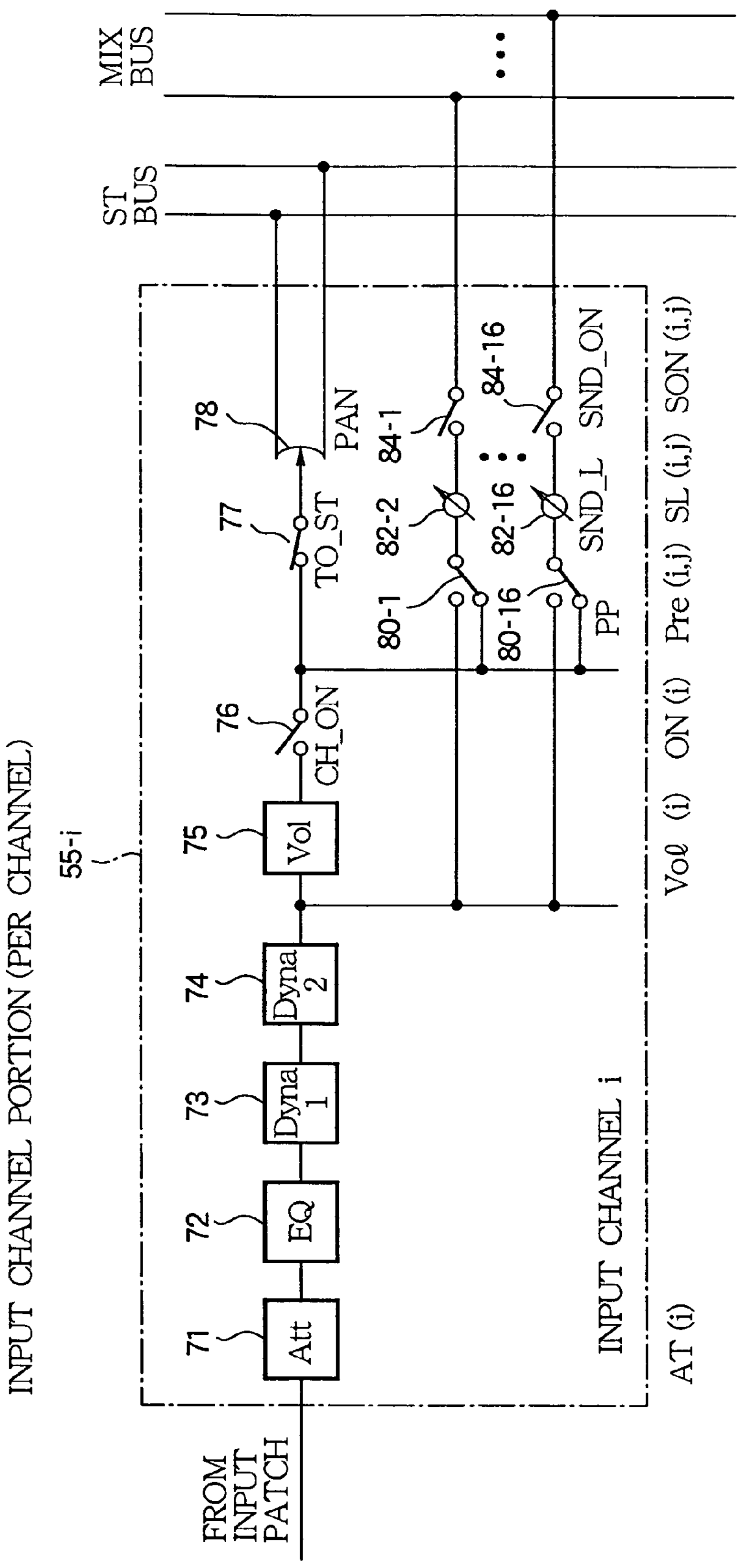
FIG. 3 is a detailed block diagram of an algorithm structure for an input channel adjuster.

A detailed configuration of the algorithm of the input channel adjuster 55 will now be described with reference to FIG. 3. Reference numeral "55-*i*" in FIG. 3 denotes an ith input channel adjuster, which performs audio volume and quality adjustment in the ith input channel ($1 \leqq i \leqq 48$). "71" in the ith input channel adjuster "55-*i*" denotes an attenuator that attenuates an input audio signal. "72" denotes an equalizer that adjusts the frequency characteristics of an audio signal using a "4" band parametric equalizer or the like. "73" and "74" denote first and second dynamics adjusters that perform compressor processing, gate processing, etc., on the audio signal. "75" denotes an audio volume adjuster that adjusts the gain of the audio signal of the ith input channel. "76" denotes an on/off switch that turns on/off the entirety of the ith input channel. "77" denotes a stereo send on/off switch that turns on/off the audio signal of the ith input channel to the stereo output buses 56. "78" denotes a pan setter that performs setting of left and right audio volume balance when providing the audio signal to the stereo output buses 56.

Reference numerals "80-1" to "80-16" denote signal switches that switch audio signals, which can be output from the ith input channel adjuster to the 16 mix buses, according to the fade mode. Specifically, the signal switches 80-1 to 80-16 allow an output signal of the second touch mix adjuster 74 to be selected when the fade mode has been set to "pre-fade" and an output signal of the on/off switch 76 to be selected when the fade mode has been set to "post-fade". "82-1" to "82-16" denote send level adjusters that adjust gains (i.e., send levels) of signals to be output to the mix buses. "84-1" to "84-16" denote send on/off switches that set on/off states of the audio signal to the mix buses.

1.3. Configuration of Panel 1.3.1. Overall Configuration of Panel

The configuration of the operating panel 30 of the digital mixer of this embodiment will now be described with reference to FIG. 4. The operating panel 30 includes a left section 30*a*, a central section 30*b*, and a right section 30*c*. "31" to "34" in the left section 30*a* denote four input channel strip portions in which 1st to 32nd channel strips, grouped into the four portions each having 8 channel strips, are sequentially provided to adjust the gains or the like of the 1st to 32nd input channels. "35" and "36" in the right section 30*c* denote two input channel strip portions in which 33rd to 48th channel strips, grouped into the two portions each having 8 channel strips, are sequentially provided to adjust the gains or the like of the 33rd to 48th input channels. "37" denotes a stereo output channel strip portion that includes a pair of channel strips to adjust the left and right gains or the like of the stereo output channel unit 60.

The above-mentioned touch panel 2 is provided in the central section 30*b* at or near the center therein. "38" denotes a level meter portion including a plurality of level meters that display audio signal levels of the components. "40" denotes a parameter operating portion including a plurality of operators or the like that adjust parameters or the like of a "selected channel", which is an input and output channel selected for setting specific parameters and the like. The input and output channels of the digital mixer of this embodiment are divided into a plurality of groups. The following is a description of these groups. The input and output channels are divided into 6 groups, each including 8 channels. The mix output channels are 16 channels, which are divided into two groups, each including 8 channels. The stereo output channels are a pair of left and right channels, which are grouped into one group. That is, the input and output channels are all divided into 9 groups.

Reference numeral "46" denotes a group selector including a plurality of switches that selects one of the groups. "42" denotes an assigned channel strip portion that adjusts the gains or the like of channels belonging to a group selected by the group selection operating portion 46. The touch panel 2 displays detailed states of the channels belonging to the selected group. "44" denotes a scene operating portion that includes switches or the like used to perform manipulations such as a scene number setting manipulation, a scene storage manipulation, and a recall manipulation.

Reference numerals "47" and "48" denote bookmark switches that are used to bookmark a screen currently displayed on the touch screen 2 or to call a bookmarked screen. In this embodiment, up to two bookmarks can be set since the number of the bookmark switches is two. "49" denotes a scene operating portion in which 8 mute buttons corresponding to 8 mute groups are arranged. One or more input and output channels are previously assigned to each of the mute groups. Once one of the mute buttons is depressed, all the audio volumes of input and output channels belonging to a corresponding mute group are set to mute. When faders associated with the input and output channels are present on the operating panel 30, manipulation positions of the faders are moved to a mute position.

1.3.2. Detailed Configuration of Scene Operating Portion 44

Figure 5A:
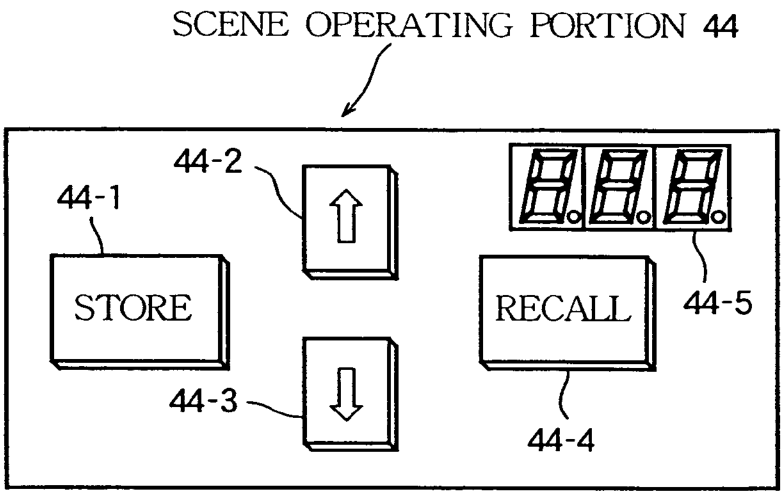
FIGS. 5*a* and 5*b* are plan views of a scene operating portion and a group selection operating portion of the panel.

A detailed configuration of main portions on the operating panel 30 will now be described. First, a detailed configuration of the scene operating portion 44 is described with reference to FIG. 5*a*. In FIG. 5*a*, "44-5" denotes a scene number display portion that displays a scene number to be stored or recalled. "44-2" and "44-3" denote up and down buttons for incrementing and decrementing the scene number. "44-1" denotes a store button for storing values of current data as scene data of the number displayed on the scene number display portion 44-5. "44-4" denotes a recALL-button for recalling scene data of the number displayed on the scene number display portion 44-5 so that it is used as current data.

1.3.3. Detailed Configuration of Group Selection Operating Portion 46

A detailed configuration of the group selection operating portion 46 will now be described with reference to FIG. 5*b*. In FIG. 5*b*, "46-1" to "46-6" denote input channel selection keys, each of which is used to select a corresponding one of the 6 groups of input channels. "46-7" and "46-8" denote mix output channel selection keys, each of which is used to select a corresponding one of the two groups of mix output channels. "46-9" denotes a stereo output channel selection key that is used to select the stereo output channel group. The groups corresponding to the input channel selection keys 46-1 to 46-6 correspond respectively to the input channel strip portions 31 to 36 in FIG. 4. It can be seen from FIG. 5*b* that the input channel selection keys 46-1 to 46-6 are arranged in the same positional relationship as the input channel strip portions 31 to 36 arranged on the operating panel 30.

Figure 4:
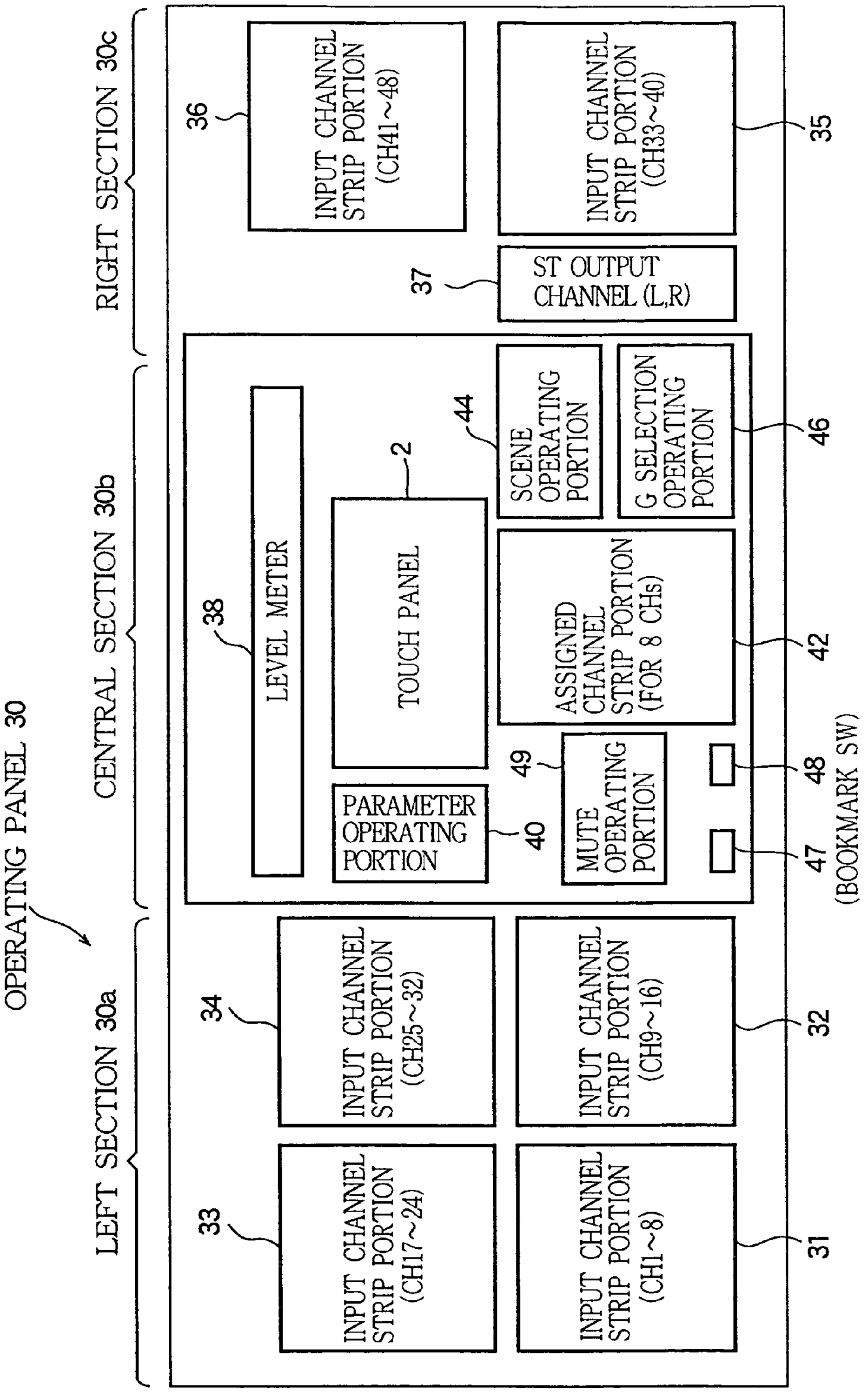
FIG. 4 is a plan view of an operating panel in the digital mixer.
Figure 5B:
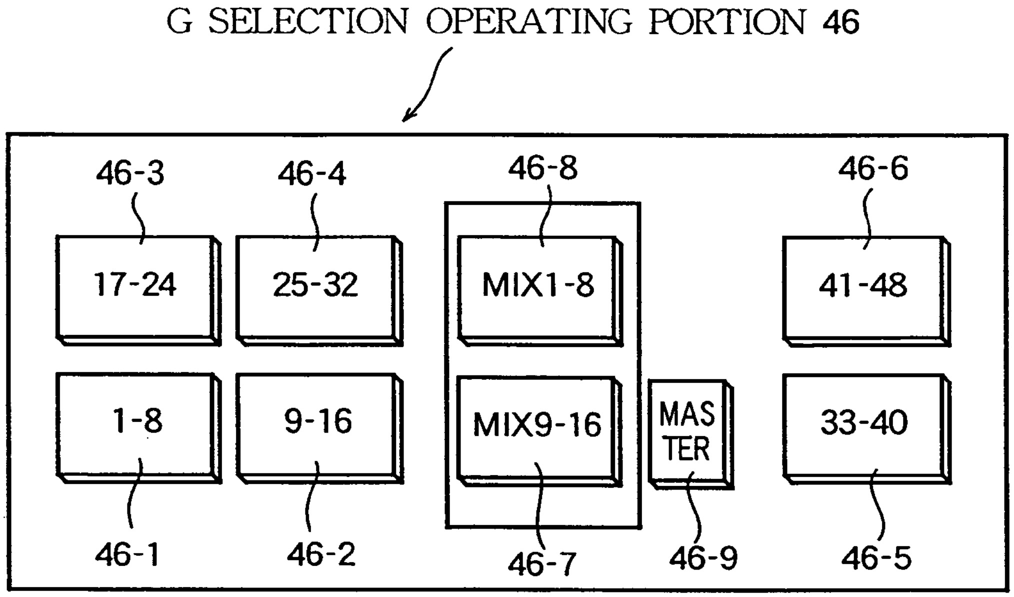

Likewise, the stereo output channel selection key 46-9 is provided to the left of the input channel selection key 46-5 since the stereo output channel strip portion 37 is provided to the left of the input channel strip portion 35 as shown in FIG. 4. Dedicated channel strip portions associated with the groups of mix output channels are not provided on the operating panel 30. Thus, mix output channel selection keys 46-7 and 46-8 corresponding to the mix output channel groups are arranged on the group selection operating portion 46 at or near the center thereof. The reference numerals of the elements of the group selection operating portion 46 have a form of "46-g" ("g" is a positive integer 1-9). The value "g" is used as an identification number of each group in a process that will be described later.

1.3.4. Detailed Configuration of Assigned Channel Strip Portion 42

A detailed configuration of the assigned channel strip portion 42 will now be described with reference to FIG. 6*a*. The assigned channel strip portion 42 includes 8 channel strips having the same structure that are arranged in a transverse direction. "501" in the leftmost channel strip denotes a knob that is used for a variety of purposes such as setting of an attenuation rate of the attenuator 71 and setting of the send levels of the send level adjusters 82-1 to 82-16. Therefore, the knob 501 is of an endless rotation type. Specifically, when the knob 501 is manipulated, the amount of a corresponding parameter is set according to an angle by which the knob 501 is rotated through the manipulation. "502" denotes a selection (SEL) key that is used to set a channel associated with the corresponding channel strip as a selected channel. "503" denotes a cue key that is used to monitor an audio signal of the corresponding channel. "504" denotes a level meter that includes a plurality of LEDs to display an output level of the corresponding channel. "505" denotes an on/off key that is used to control the state of the on/off switch 76. "506" denotes an electric fader that adjusts the gain of the audio volume adjuster 75.

1.3.5. Detailed Configuration of Input Channel Strip Portions 31 to 36

A detailed configuration of the input channel strip portions 31 to 36 will now be described with reference to FIG. 6*b*. Each of the input channel strip portions 31 to 36 includes 8 channel strips having the same structure that are arranged in a transverse direction. "501" in the leftmost channel strip denotes a selection (SEL) key, "513" denotes a cue key, "514" denotes a level meter, "515" denotes an on/off key, and "516" denotes an electric fader, which have the same functions as the elements 502 to 506 of the assigned channel strip portion 42. A knob corresponding to the knob 501 in the assigned channel strip portion 42 is not provided in any of the input channel strip portions 31 to 34. Accordingly, in order to adjust a parameter of an input channel that can be adjusted using the knob 501, a group including the input channel is selected using the group selection operating portion 46 so that the states of the group are reflected in the assigned channel strip portion 42.

2. Example of Display Screen 2.1. Recall Safe Setting Window 200

One example of a variety of display screens on the display of the touch panel 2 will now be described. Such a screen is displayed as the user performs a screen selection manipulation on the touch panel 2.

Figure 7:
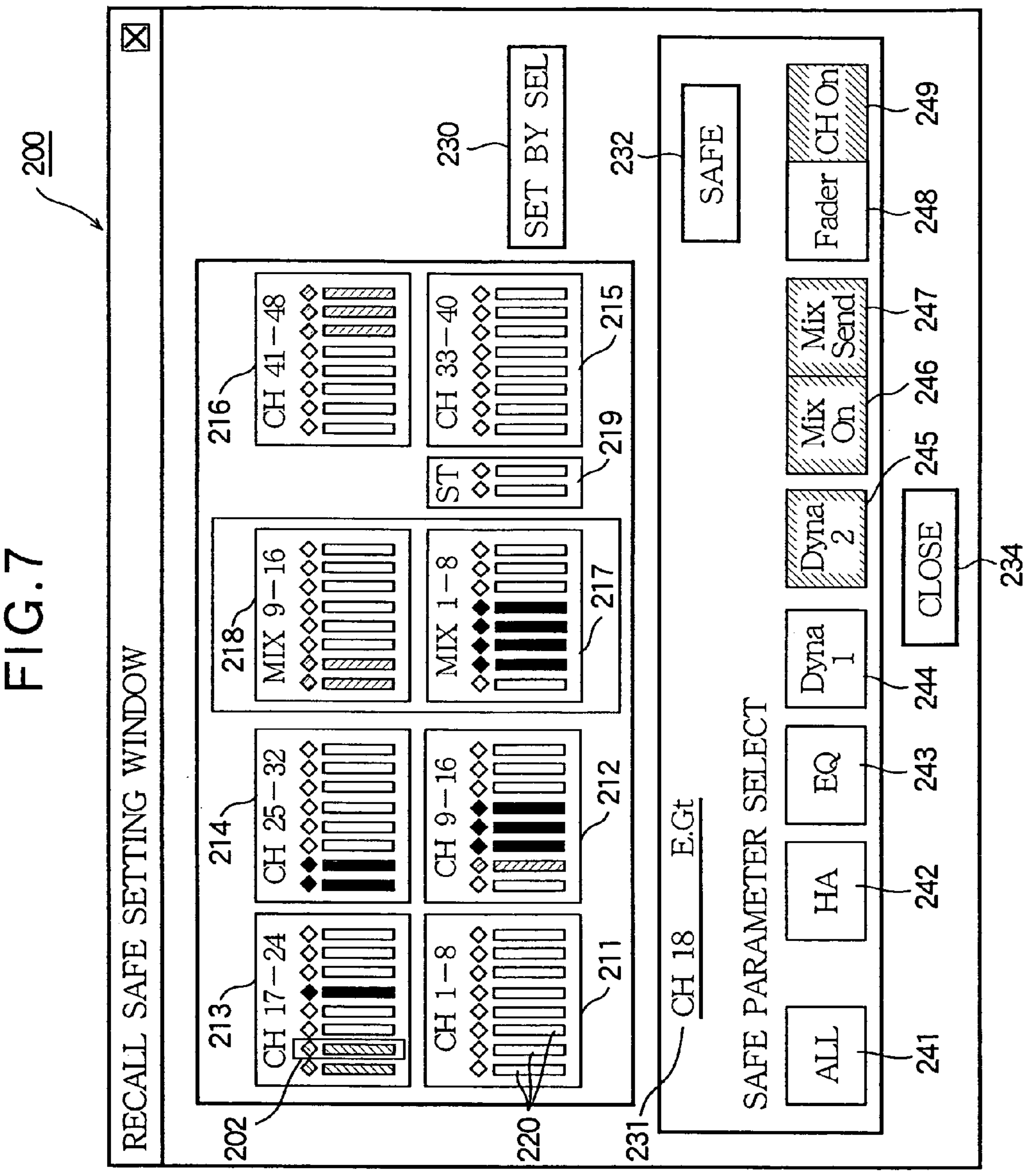
FIG. 7 illustrates an example display image of a recall safe setting window.

FIG. 7 shows an example display of the recall safe setting window 200 for setting a recall safe function. "211" to "216" in FIG. 7 denote input channel display portions, "219" denotes a stereo output channel display portion, "217" and "218" denote mix output channel display portions, which correspond respectively to the above-mentioned groups. The same number of channel images 220, each including a long rectangle and a tilted square, as the number (8 or 2) of channels of a corresponding group are displayed on each of the display portions. In the same manner as the above-mentioned group selection operating portion 46, the input channel display portions 211 to 216 and the stereo output channel display portion 219 are arranged in the same arrangement relationship as the corresponding channel strip portions in the operating panel 30. Specifically, the input channel display portions 211 to 216 correspond respectively to the input channel strip portions 31 to 36 in FIG. 4 and are arranged in the same positional relationship as the input channel strip portions 31 to 36. As the stereo output channel strip portion 37 is arranged to the left of the input channel strip portion 35 in FIG. 4, the corresponding stereo output channel display portion 219 is also arranged to the left of the input channel display portion 215.

Dedicated channel strip portions associated with the groups of mix output channels are not provided on the operating panel 30. Therefore, mix output channel display portions 217 and 218 corresponding to the mix output channel groups are arranged on the recall safe setting window 200 at or near the center thereof (specifically, at a position of the window 200 corresponding to the assigned channel strip portion 42 of the central section 30*b*). "202" denotes a cursor that is displayed at the position of a channel image 220 of a setting target channel for which a recall safe function is to be set. Here, when the recall safe function of the setting target channel has been set to ON, the user can select, through a recall manipulation, whether to prohibit recall of all parameters of the corresponding channel or to prohibit recall of only a partial group of parameters thereof. Setting whether or not to prohibit update of each parameter group of each channel through a recall manipulation is referred to as "parameter safe setting". Specifically, a channel with the recall safe function set to ON is displayed as an outlined white image, a channel with the recall safe function set to ON and a parameter safe function of a partial parameter group set to ON is displayed as a blue image (a hatched image in the drawing), and a channel with the recall safe function set to ON and a parameter safe function of all parameter groups set to ON is displayed as a green image (a bold image in the drawing).

"230" denotes a SET_BY_SEL button which is used to select one of the following two operating modes:

(1) a SET_BY_SEL mode in which an on/off state of the recall safe function of each channel is displayed and set using a corresponding SEL key and a recall function setting target channel is displayed and set; and (2) a normal mode in which an on/off state of the recall safe function of each channel is displayed and set using a SAFE button 232 that will be described later and the SEL key is used to display and set a recall function setting target channel.

This SET_BY_SEL button 230 is ON (i.e., is lit) when the SET_BY_SEL mode is selected. When the SET_BY_SEL mode is selected, a SEL key of a channel strip corresponding to a channel, for which the recall safe function is ON, among the SEL keys on the operating panel 30 is lit and the other SEL keys are unlit. That is, based on whether or not a SEL key of each channel strip is lit or not, it is possible to determine whether or not the recall safe function of a corresponding channel is ON or OFF. When the normal mode is selected, only a SEL key of a channel strip corresponding to a channel that has been set as a selected channel SC described later is lit and the other SEL keys are unlit.

Reference numeral "231" denotes a channel number display portion that displays the number of a setting target channel for which the recall safe function is to be set. "232" denotes a SAFE button that is lit or not to display whether the recall safe function of the setting target channel is on or off. "234" denotes a close button that is depressed to close the recall safe setting window 200. "241" denotes an ALL-button that is used to set the parameter safe function of all parameter groups to ON and to be lit when all the parameter groups are ON. Buttons 242 to 249 are used to set the parameter safe function of parameter groups to ON/OFF. The ALL-button 241 and the buttons 242 are not lit at the same time. That is, when the parameter safe function of all the parameter groups is ON and the ALL-button 241 is lit, all the buttons 242 to 249 are unlit.

The HA button 242 corresponds to the attenuator 71 (see FIG. 3), the EQ button 243 corresponds to the equalizer 72, the Dyna1 button 244 corresponds to the first dynamics adjuster 73, the Dyna2 button 245 corresponds to the second dynamics adjuster 74, the MIX ON button 246 corresponds to the send on/off switches 84-1 to 84-16, the MIX send button 247 corresponds to the signal switches 80-1 to 80-16 and the send level adjusters 82-1 to 82-16, the fader button 249 corresponds to the audio volume adjuster 75, and the channel on button 249 corresponds to the on/off switch 76. Each of these buttons is used to set the parameter safe function of a parameter group in a corresponding block ON or OFF and the button is lit when the parameter safe function is ON. Let us assume that parameter group identification numbers "1" to "8" are assigned to the parameter groups corresponding to the buttons 242 to 249. The buttons 245 to 247 and 249 are hatched in the drawing to indicate that the buttons are ON.

The following flags are stored in the RAM 22 at a specific region thereof in order to store the setting states of the window 200.

(1) Recall safe flag SEF (i): a flag indicating whether the recall safe function is ON ("1") or OFF ("0") for channel number "i" of all input and output channels.

(2) Parameter safe flag SPF (i, j): a flag indicating whether the parameter safe function is ON ("1") or OFF ("0") for a parameter group having an identification number "j" among parameter groups having channel number "i".

2.2. Mute Group Setting Window 300

Figure 8:
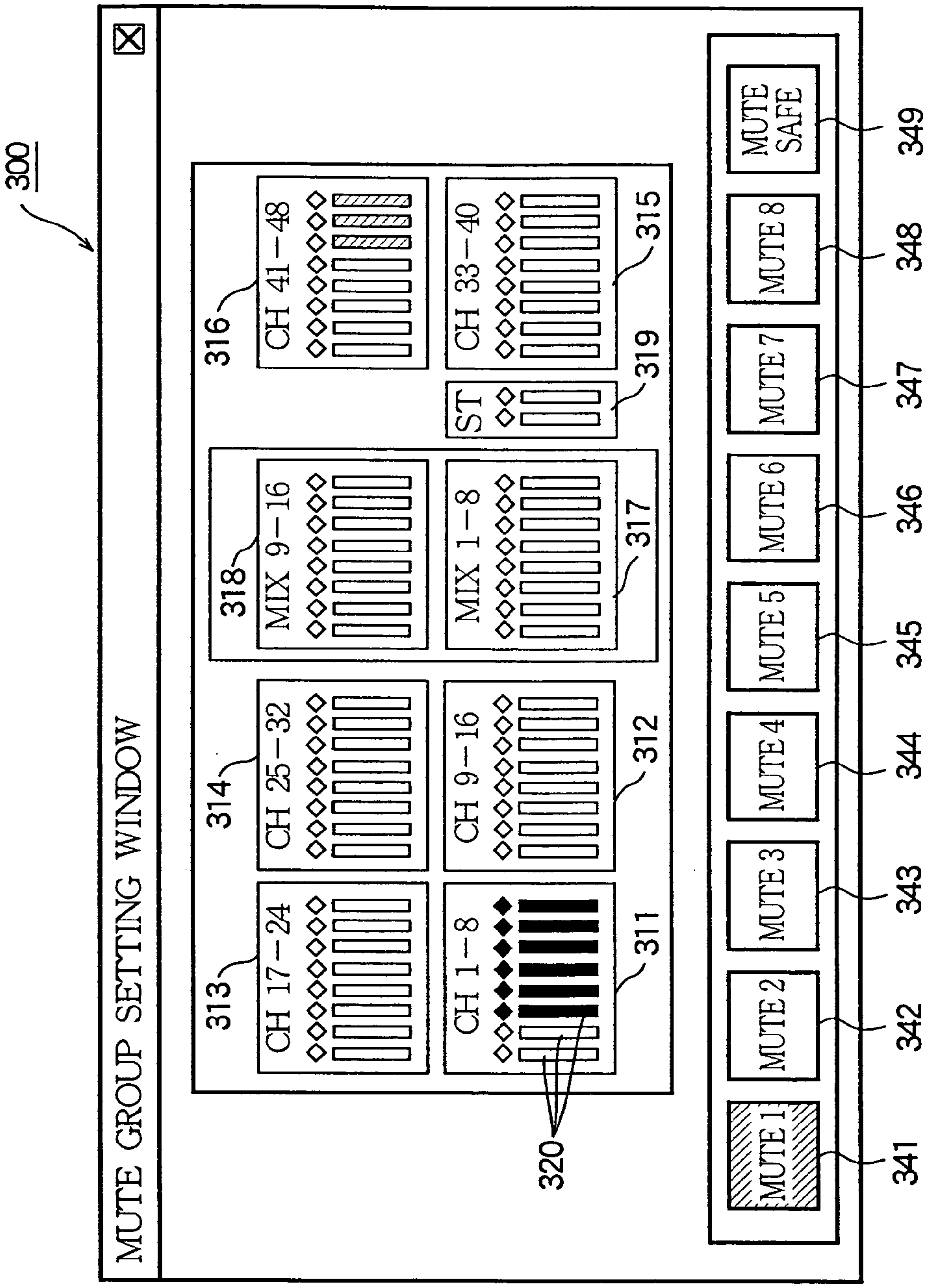
FIG. 8 illustrates an example display image of a mute group setting window.

FIG. 8 illustrates an example display of the mute group setting window 300 used to set a mute group. In FIG. 8, "311" to "316" denote input channel display portions, "319" denotes a stereo output channel display portion, and "317" and "318" denote a mix output channel display portion, which are configured in the same manner as the channel display portions 211 to 219 in the above-mentioned recall setting window 200. Channel images 320 in the same form as the channel images 220 are displayed inside the display portions 311 to 318. "341" to "348" denote first to eighth mute setting buttons, each of which is used to select a corresponding one of the first to eighth mute groups as a mute group to be displayed and set in the channel display portions 311 to 319. A button associated with the selected mute group is lit, which is hatched in the drawing. "349" denotes a mute safe button that is used to display and set a mute safe group in the channel display portions 311 to 319. Mute channels included in any mute safe group are not muted through manipulation of the mute operating portion 49 no matter what mute safe group includes the mute channels.

When the user desires to display and set the state of a mute group or a mute safe group, the user first depresses a corresponding one of the first to eighth mute setting buttons 341 to 348 or the mute safe button 349. Only the last depressed one of the buttons is lit and channels included in the corresponding group are lit in the channel display portions 311 to 319. In each of the channel strip portions 31 to 37, SEL keys of channels included in the corresponding group are lit and SEL keys of channels not included therein are unlit. In order to change whether or not a channel is included in the group, a SEL key of the channel is depressed. This reverses the value of information indicating whether or not the channel is included in the group and also reverses the lit or unlit states of a SEL key and a channel image 320 corresponding to the channel.

Mute group numbers k of 1 to 8 are assigned to the first to eighth mute groups. In order to store the setting states of the window 300, mute flags MTF (i, k) for combinations of channel numbers i of all input channels and group numbers k of all mute groups are stored in the RAM 22 at a specific region. Mute safe flags MTS(i) for all channels i are also stored in the RAM 22. A value of "1" of the mute flag MTF (i, k) indicates that an audio signal of the channel i is muted when the kth mute button on the mute operating portion 49 is depressed, provided that the channel i is not included in the mute safe group. A value of "1" of the mute safe flag MTS (i) indicates that the channel i is included in the mute safe group.

3. Operation of Embodiment 3.1. SEL Key Manipulation Event of Window 200

A description will now be given of the operation of this embodiment.

Figure 9A:
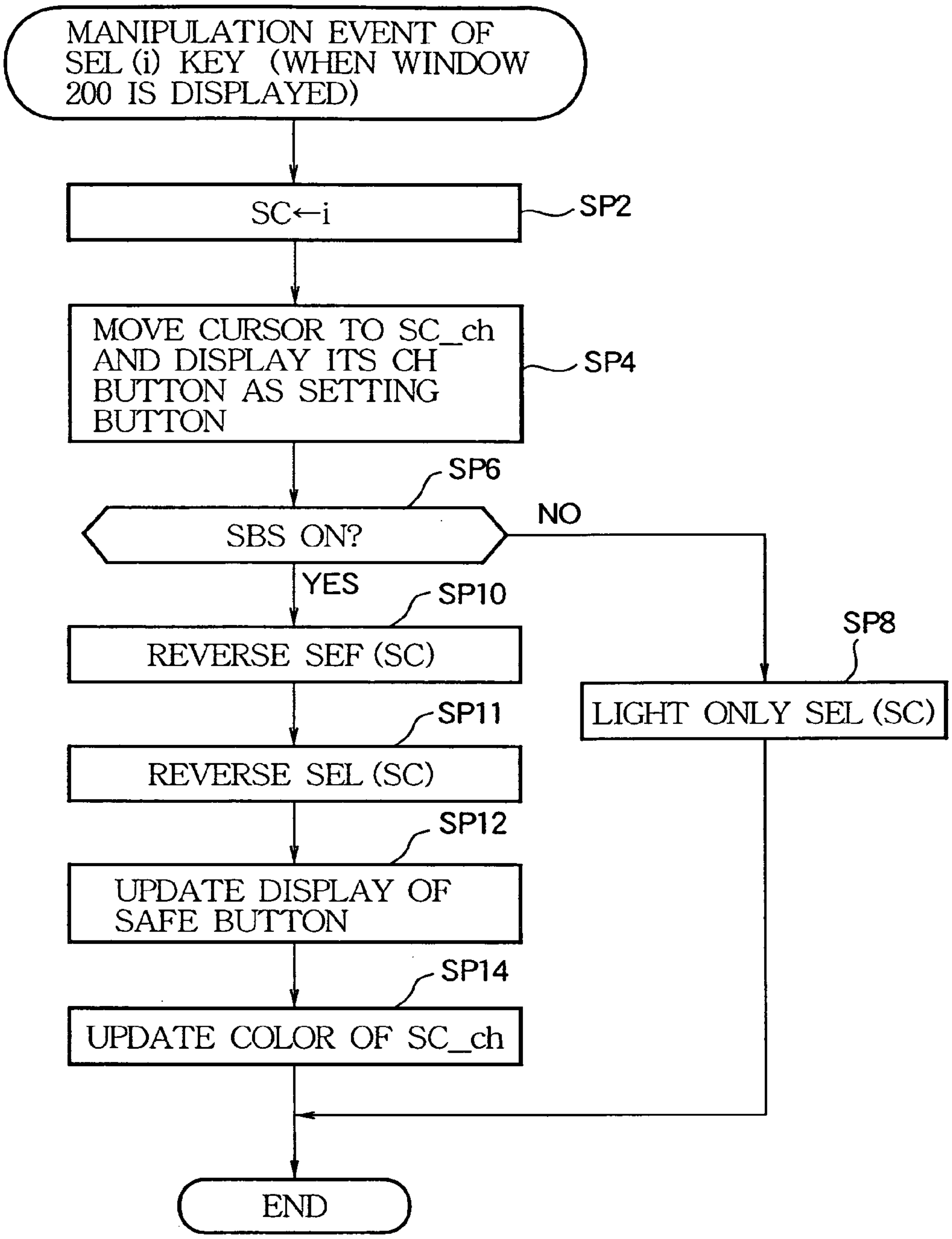
FIGS. 9*a*-9*c* are flow charts of a variety of event process routines associated with the recall safe setting window.

When the recall safe setting window 200 is displayed on the touch panel 2, a SEL key manipulation event routine shown in FIG. 9*a* is activated upon depressing a SEL key 502 or 412 in a channel strip (see FIG. 6). When the process of FIG. 9*a* proceeds to step SP2, the number of a selected channel SC is set to a channel number i associated with the depressed SEL key. When the process proceeds to step SP4, a cursor 202 is moved to a position of the selected channel SC in the channel display portions 211 to 219 and the display of the channel number display portion 231 is changed to the selected channel number SC. In addition, the lit or unlit state of each of the SAFE button 232 and the buttons 241 to 249 is changed to a state corresponding to the current setting state of the selected channel number SC.

The process then proceeds to step SP6 to determine whether or not the operating mode is a SET_BY_SEL mode. When this determination is NO, the process proceeds to step SP8 to light one of the SEL keys 502 and 512 associated with the selected channel SC and put out the other SEL key. As a channel corresponding to the manipulated SEL key is set as the selected channel SC, the user can set the ON/OFF state of the recall safe function of the corresponding channel by manipulating the SAFE button 232 and also can set the ON/OFF state of the parameter safe function of each parameter of the corresponding channel by manipulating the buttons 241 to 249.

When the determination of step SP6 is YES, the process proceeds to step SP10 to reverse the recall safe flag SEF (SC). The process then proceeds to step SP11 to control the lit or unlit state of a SEL key associated with the selected channel SC according to the on/off state of a flag SEF (SC) after the change, thereby reversing the lit or unlit state of the SEL key. That is, in the SET_BY_SEL mode, each SEL key not only specifies a selected channel number SC but also functions as a key for switching ON/OFF states of the recall safe function. A SEL key for which the recall safe function is ON is lit and a SEL key for which the recall safe function is OFF is unlit. Therefore, if a SEL key is depressed, then the lit or unlit state of the SEL key is also changed according to the ON/OFF state of the recall safe function. The process then proceeds to step SP12 to reverse the lit or unlit state of the SAFE button 232 in the window 200 according to the state of a flag SEF (SC) after the change. The process then proceeds to step SP14 to change the display color of a channel image 220 at which the cursor 202 is positioned and which corresponds to the selected channel number SC. Specifically, if the channel image is an "outlined white image" before the SEL key is depressed, the color of the channel image is changed to "blue" or "green" according to the state of the parameter safe function upon the depression, and if the color of the channel image is "blue" or "green" before the SEL key is depressed, the channel image is changed to an "outlined white image" upon the depression.

3.2. Manipulation Event of ALL-Button 241

Figure 9B:
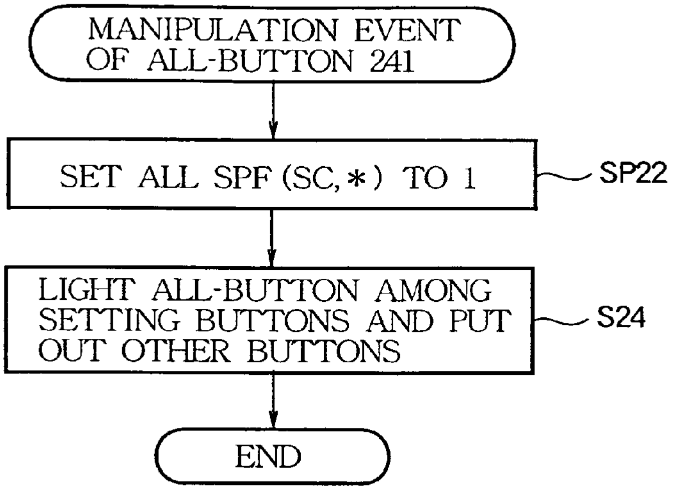

A process when the ALL-button 241 in the recall safe setting window 200 is depressed will now be described with reference to FIG. 9*b*. When the process of FIG. 9*b* proceeds to step SP22, parameter safe flags SPF (SC, j) of all parameter groups j (j=1-8) are set to "1" (ON). The process then proceeds to step SP24 to light the ALL-button 241 and put out the buttons 242 to 249.

3.3. Manipulation Event of Buttons 242 to 249

Figure 9C:
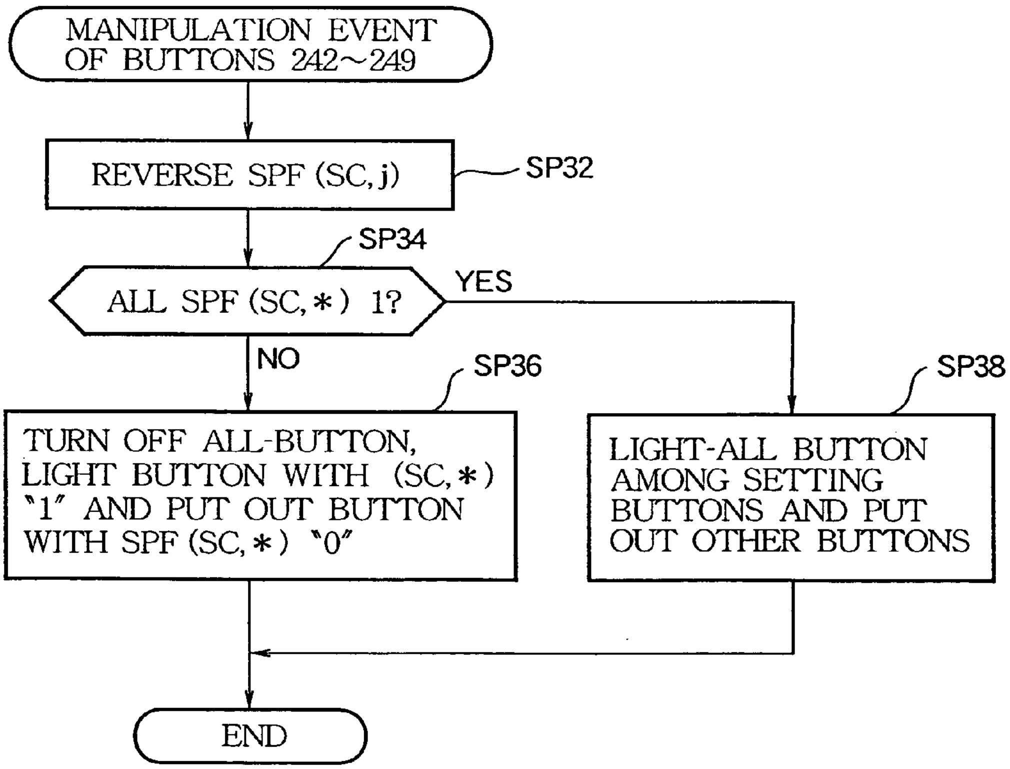

A process when one of the buttons 242 to 249 in the window 200 is depressed will now be described with reference to FIG. 9*c*. When the process of FIG. 9*c* proceeds to step SP32, the value of a parameter safe flag SPF (SC, j) is reversed. For example, if the EQ button 243 is depressed, a flag SPF (SC, 2) is reversed since an identification number j of a corresponding parameter group is 2. The process then proceeds to step SP34 to determine whether or not parameter safe flags SPF (SC, j) of all parameter groups are "1". When this determination is NO, the process proceeds to step SP36 to put out the ALL-button 241, to light a button whose parameter safe flag SPF (SC, j) is "1", and to put out a button whose parameter safe flag SPF (SC, j) is "0". On the other hand, if the determination of step SP34 is YES, the process proceeds to step SP38 to light the ALL-button 241 and to put out all the buttons 242 to 249. If all the parameter safe functions of the buttons 242 to 249 are set to ON as the user sequentially depresses the buttons 242 to 249, then the buttons 242 to 249 are immediately put out and the ALL-button 241 is lit. If the flag SEF (SC) is "1", the display color of the channel image 220 of the selected channel SC is updated with "blue" at step SP36 and is updated with "green" at step SP38.

3.4. Scene Recall Event

Figure 10:
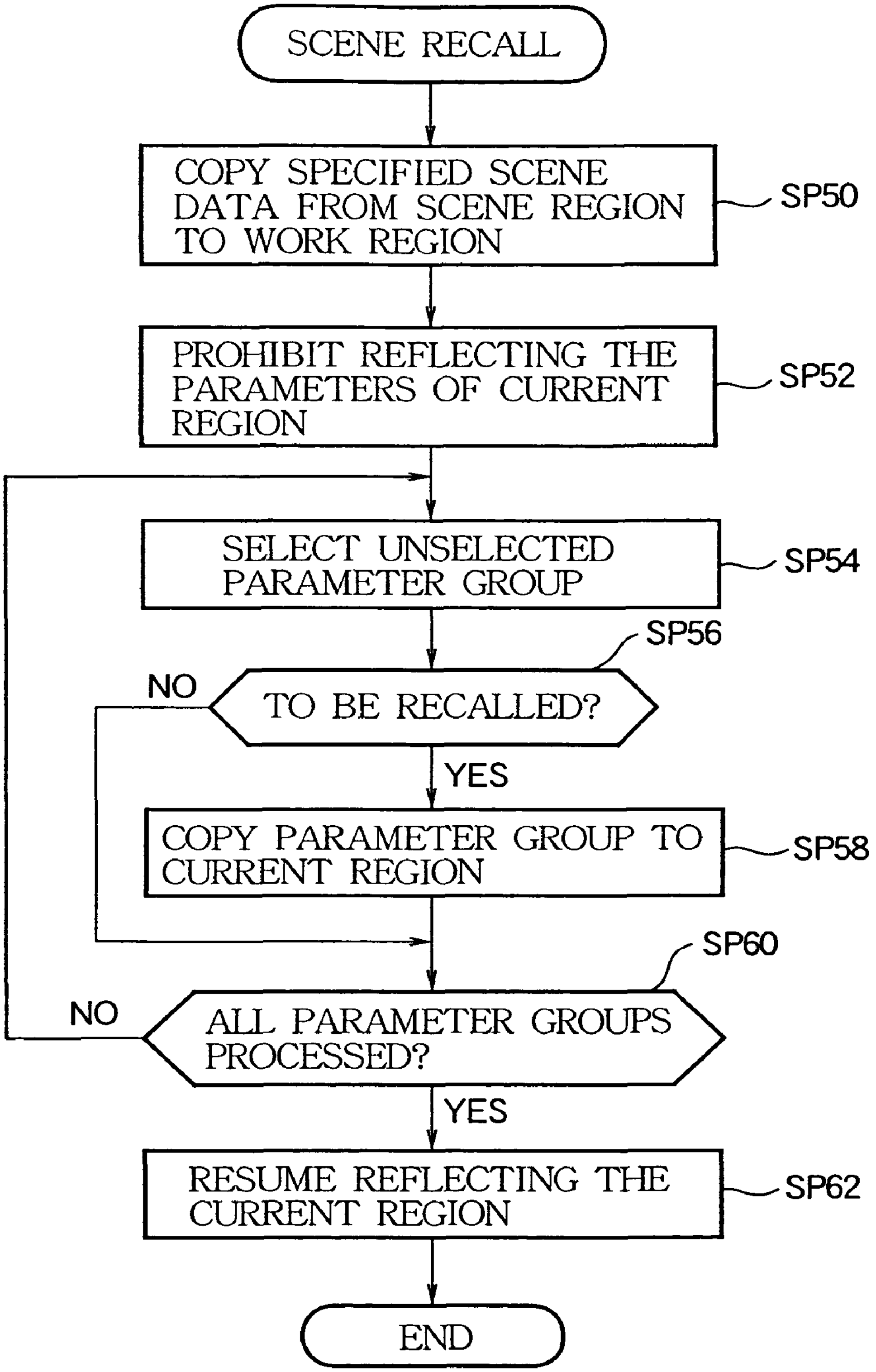
FIG. 10 is a flow chart of a scene recall event process routine.

A process when a scene recall event is generated, i.e., when the recALL-button 44-4 on the scene operating portion 44 is depressed will now be described with reference to FIG. 10. When the process of FIG. 10 proceeds to step SP50, specified scene data is copied to a work region secured in the RAM 22. The process then proceeds to step SP52 to prohibit the signal processor 8 from reflecting (or using) current data stored in the current region of the RAM 22. Specifically, the signal processor 8 performs audio signal processing or the like based on parameters in the current region before the prohibition. The process then proceeds to step SP54 to select a parameter group, which has not yet been selected, from the parameter groups in the work group. The process then proceeds to step SP56 to determine whether or not the parameter group is to be recalled based on both a recall safe flag SEF (i) of a channel i associated with the parameter group and a parameter safe flag SPF (i, j) associated with the channel i and the parameter group j.

Specifically, when the recall safe flag SEF (i) is "0", the parameter group is set to be recalled regardless of the value of the parameter safe flag SPF (i, j). When the recall safe flag SEF (i) is "1", the parameter group is set to be recalled, provided that the parameter safe flag SPF is "0". If the determination of step SP56 is YES, the process proceeds to step S58 to copy the parameter group stored in the work region to the current region. On the other hand, if the determination of step SP56 is NO, the process skips step SP58, so that the parameter group is not copied to the current region. Parameter groups for which the recall safe function is not set may be included in the current data. Thus, the process is set such that the determination of step SP56 is always YES for such parameter groups. The process then proceeds to step SP60 to determine whether or not the above steps SP54 to SP58 have been completed for all the parameter groups. If this determination is NO, the process returns to step SP54 and repeats the above steps SP54 to SP58. If the above steps SP54 to SP58 have been completed for all the parameter groups, the process proceeds to step SP62 to resume the process in which the signal processor 8 reflects the current data stored in the current region.

3.5. SEL Key Manipulation Event of Window 300

Figure 11A:
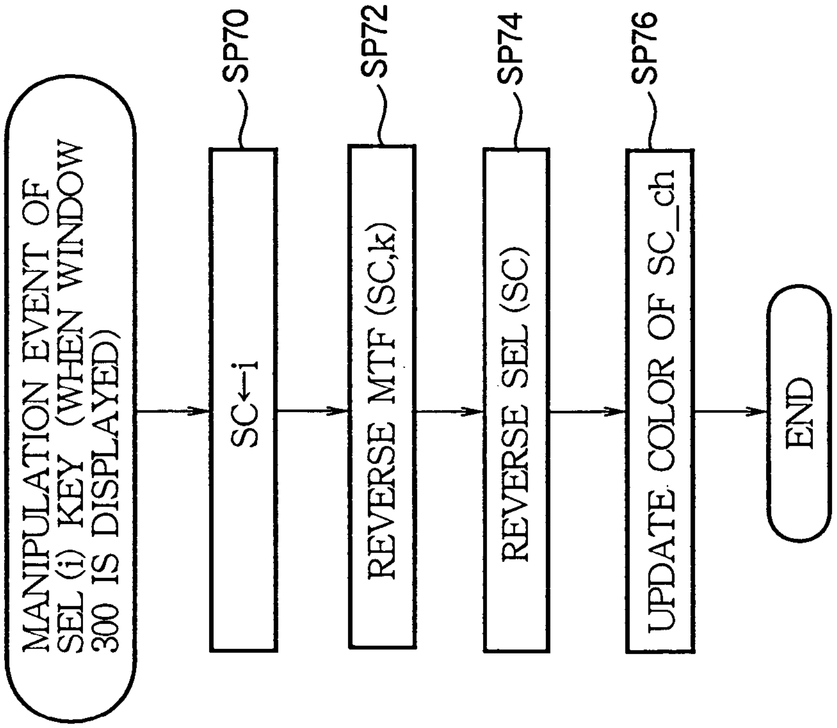
FIGS. 11*a* and 11*b* are flow charts of a variety of event process routines associated with the mute group setting window.

When the mute group setting window 300 is displayed on the touch panel and the mute setting buttons 341 to 348 associated with the mute group number k are lit, a SEL key manipulation event routine shown in FIG. 11*a* is activated upon depressing a SEL key 502 or 512 in a channel strip (see FIG. 6). When a process of FIG. 11*a* proceeds to step SP70, the value of a selected channel number SC is set to a channel number i associated with the depressed SEL key. The process then proceeds to step SP72 to reverse the value of a mute flag MTF (SC, k). The process then proceeds to step SP74 to reverse the lit or unlit state of a SEL key associated with the selected channel number SC. That is, in the window 300, each SEL key functions as a key for switching between a state in which the corresponding channel is included in the mute group k and a state in which the corresponding channel is not included in the mute group k. SEL keys of channels included in the mute group k are lit and SEL keys of channels not included in the mute group k are unlit. Therefore, if a SEL key is depressed, then the lit or unlit state of the SEL key is also changed according to the mute flag MTF (SC, k). The process then proceeds to step SP76 to change the display color of the channel image 320 in the window 300 according to its state after the change. Specifically, if the channel image is an "outlined white image", indicating that the channel is not included in the mute group k, before the SEL key is depressed, the color of the channel image is changed to "red" upon the depression, and if the color of the channel image is "red", indicating that the channel is included in the mute group k, before the SEL key is depressed, the channel image is changed to an "outlined white image" upon the depression.

3.6. Manipulation Event of Mute Operating Portion 49

Figure 11B:
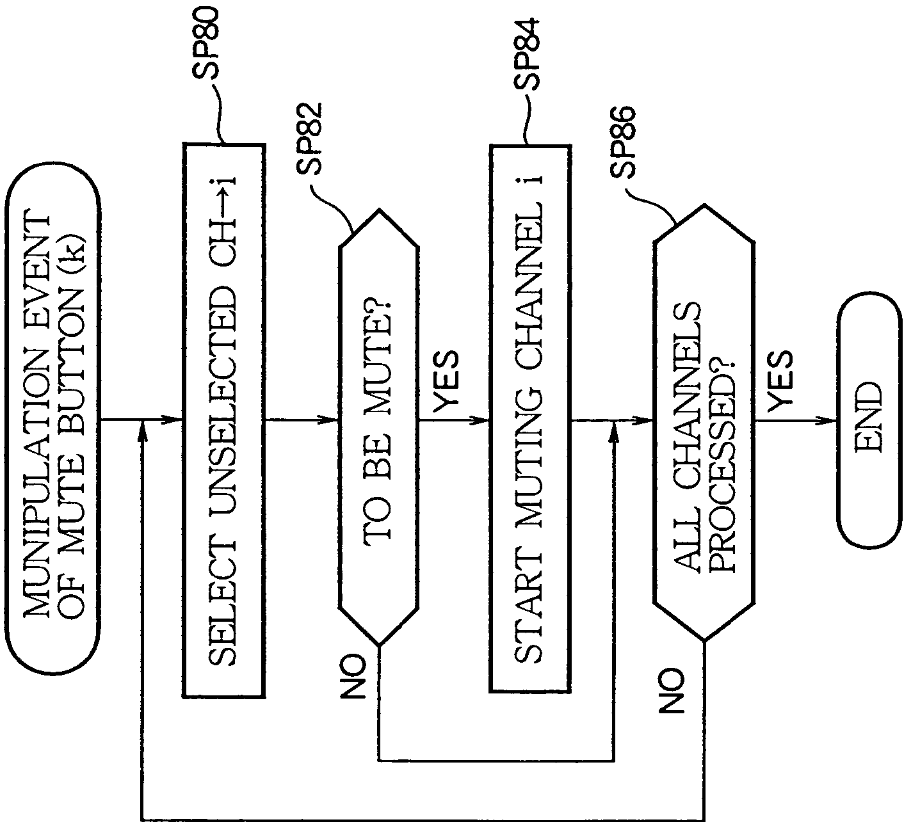

A process when a kth mute button on the mute operating portion is depressed will now be described with reference to FIG. 11*b*. When the process of FIG. 11*b* proceeds to step SP80, a channel i, which has not yet been selected, is selected from all the input and output channels. The process then proceeds to step SP82 to determine whether or not the channel i is to be muted. Specifically, if the mute flag MTF (i, k) is "1" and the mute safe flag MTS (i) is "0", the channel i is set to be muted. If the determination of step SP82 is YES, the process proceeds to step SP84 to start muting the channel i. Specifically, from this moment, the audio volume adjuster gradually reduces the gain of the channel i until the gain reaches its minimum value. When the channel i has been assigned to a channel strip on the operating panel 30, an electric fader on the channel strip is also moved to a manipulation position corresponding to the minimum gain value. When the determination of step SP82 is NO, the process skips step SP84 so that the gain of the channel i is not changed. The process then proceeds to step SP66 to determine whether or not the above steps SP80 to SP84 have been completed for all the channels i. If this determination is NO, the process returns to step SP80 and repeats the above steps SP80 to SP86. If the above steps SP80 to SP86 have been completed for all the channels i, the process completes the routine.

4. Advantages of Embodiment

As is apparent from the above description, this embodiment has the following advantages. When the recall safe setting window 200 is displayed on the touch panel 2 and the SET_BY_SEL mode has been selected or when the mute group setting window 300 is displayed thereon, the ON and OFF states of a parameter associated with each channel can be switched using a SEL key provided on each channel strip and the ON or OFF state of the current parameter can be displayed according to the lit or unlit state of the SEL key. The channel display portions 211 to 219 and the channel display portions 311 to 319 displayed on the windows 200 and 300 allow the user to see the setting states of parameters of all channels simply by viewing the touch panel 2 without looking over the entirety of the operating panel 30. Especially for the states of mix channels, which must be selectively reflected in the assigned channel strip portion 42, the MIX channel display portions 217 and 218 (or 317 and 318) are arranged vertically on the window 200 or 300 at the center thereof, so that it is possible to view the setting states of all the channels regardless of whether or not they are reflected in the channel strips.

Figure 6A:
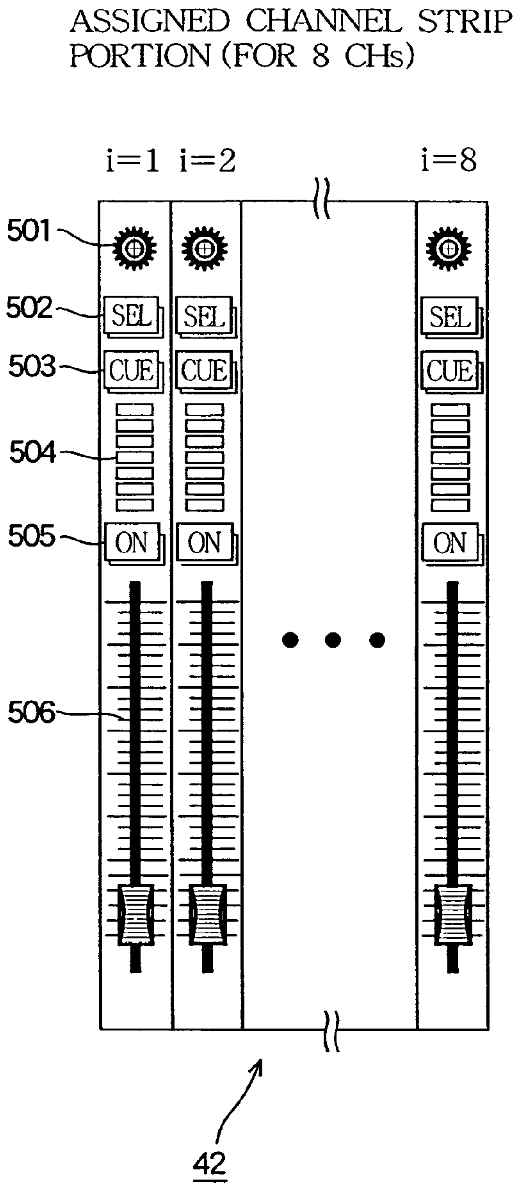
FIGS. 6*a* and 6*b* are plan views of an assigned channel strip portion and an input channel strip portion.
Figure 6B:
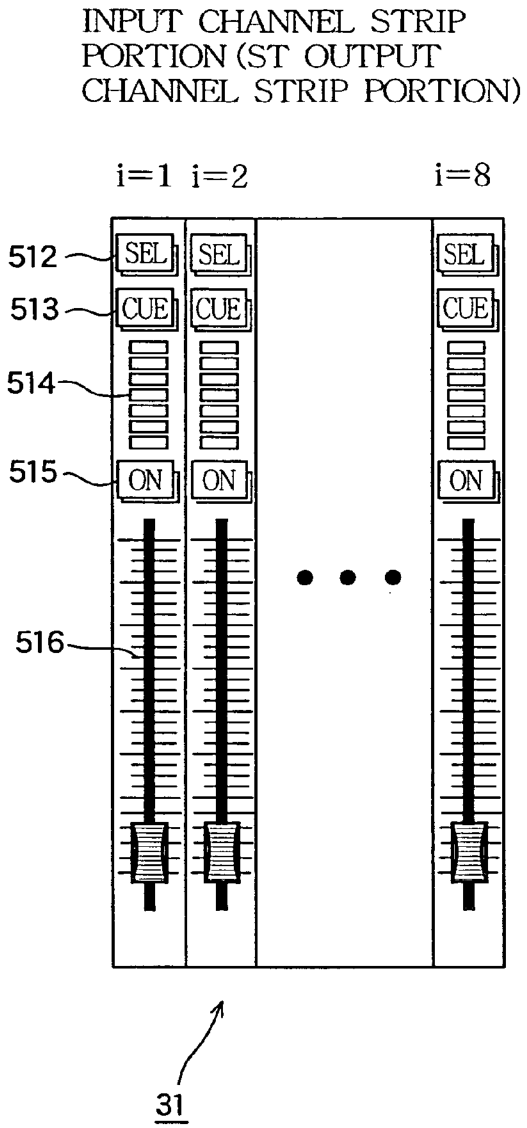

The following is a description of the reason why the SEL keys 502 and 512 rather than the CUE keys 503 and 513, the ON/OFF keys 505 and 515, and the electric faders 506 and 516 shown in FIGS. 6*a* and 6*b* are used when the channel strips are manipulated. Manipulating the CUE keys 503 and 513, the ON/OFF keys 505 and 515, and the electric faders 506 and 516 changes audio signals by changing parameters that directly affect the audio signals. Thus, it is desirable that the keys and faders be manipulated immediately when the need to change the audio signals occurs. For example, in this embodiment, it is technically possible to perform the recall safe function setting or the mute group setting using the ON/OFF keys rather than the SEL keys. However, if the need to use the original function of the ON/OFF keys occurs while such setting is performed (for example, if the need to immediately change the state of a channel to ON occurs when the channel is OFF), it is difficult to quickly cope with the need.

On the other hand, even when the SEL key is being used for the original purpose, using the SEL key makes no change to parameters that directly affect audio signals and the state of the selected channel associated with the SEL key is reflected in the parameter operating portion 40, the touch panel 2, and the like. Therefore, the parameters that affect audio signals are not changed until the parameter operating portion 40, the touch panel 2, or the like is manipulated. In many cases, even when the need to change such parameters occurs, the urgency of the need is low compared to when the need to change parameters associated with ON/OFF keys or electric faders occurs. Thus, in many cases, no trouble occurs even when it takes some time to return the digital mixer to a state in which parameter setting is possible.

The embodiment is also characterized in that the influence of an erroneous manipulation made by the user is very small. For example, one can consider that the mute group setting window 300 has already been closed and the function of a SEL key has returned to its original function although the user thinks that the window 300 is currently displayed on the touch panel 2 and a mute group is currently being set using the SEL key. In this case, even if the user depresses a SEL key by mistake, only the states of the parameter operating portion 40, the touch panel 2, and the like are changed without any significant influence on the audio signals. In the case where ON/OFF keys are used instead of SEL keys, once the user erroneously depresses an ON/OFF key, the corresponding channel sound is suddenly interrupted, which is a significant accident. In this embodiment, a SEL key, which is an operator having no influence on audio signals when it is operated alone, is used so that it is possible to minimize the influence of the operator.

In this embodiment, channel images 220 (miniature images of the operating panel), which indicate ON/OFF states of parameters, are displayed on a display (e.g., the touch panel 2) having a size sufficiently (for example, more than 10 times) smaller than that of the operating panel 30 of the digital mixer at positions corresponding to positions at which channel strip portions are arranged on the operating panel 30. The display states of the channel images 220 are similar to lit/unlit states of SEL keys of channels in channel strips on the operating panel 30. Through the miniature images, the user checks overall ON/OFF states of the parameters of the digital mixer and specifies a channel which the user desires to be changed. By viewing the corresponding channel strip portion on the operating panel 30, the user can quickly find a target channel strip in the channel strip portion and change its ON/OFF state.

5. Modifications

The present invention is not limited to the above embodiments. The following are examples of a variety of possible modifications.

(1) In the above embodiment, a variety of processes are performed through a variety of programs running on the CPU 18. The programs can be stored in and distributed through a recording medium such as a CD-ROM and a flexible disk and can also be distributed through a transmission path.

(2) In the above embodiment, a SEL key is used as an example of an indirect operator that has no influence on audio signals when it is operated alone. When such operators other than SEL keys are present, they may be used instead of the SEL keys.

(3) Of course, the present invention may be applied to digital or analog mixers in which all channel strip portions on the operating panel are fixed ones.

As described above in detail, the inventive digital mixer comprises a storage (22) that stores operating data including a plurality of parameters for controlling states of audio signals of a plurality of channels, a signal processor (8) that performs a mixing process based on the operating data, a display (2), a plurality of channel strips (220, 320) that are mounted on an operating panel (30) for a first group of channels (input channels and stereo output channels), which is at least a part of the plurality of channels, each of the channel strips (220, 320) including one or a plurality of operators arranged thereon, a display controller (18) that allows a panel imitation portion (211-219) to be displayed on the display, the panel imitation portion including a plurality of channel strip imitation images that imitate the channel strips and that are arranged in a positional relationship corresponding to a positional relationship in which the channel strips are arranged, a parameter setter (SP10, SP72) that sets a value of a specific parameter (recall safe flag SEF (i)) of a channel corresponding to a channel strip included in the plurality of channel strips upon detecting that the channel strip has been manipulated, and a display mode setter (SP14, SP76) that allows each of the channel strip imitation images to be displayed in a display mode according to the value of the specific parameter of the corresponding channel.

Preferably, the channel strips include fixed channel strips (31-37) to which all the channels are fixedly assigned and switched channel strips (42) to which selected ones of the channels are assigned, the plurality of channels includes the first group of channels (input channels and stereo output channels) fixedly assigned to the fixed channel strips and a second group of channels (MIX output channels) selectively assigned in units of layers (groups) only to the switched channel strips (42), and the panel imitation portion (211-219) includes a second group of channel display portions (217, 218, 317, 318) including a plurality of channel strip imitation images (220, 320) corresponding to the second group of channels (MIX output channels), the channel strip imitation images (220, 320) being arranged vertically in units of layers (groups) at positions corresponding to positions at which the switched channel strips (42) are arranged on the operating panel (30).

Preferably, each of the channel strips includes a direct operator (ON/OFF key, electric fader) that has an influence on an audio signal of a corresponding channel as the operator is operated alone; and an indirect operator (SEL key) that has no influence on an audio signal of a corresponding channel as the operator is operated alone, the parameter setter (SP10, SP72) sets the value of the specific parameter (recall safe flag SEF (i)) based on an operating state of the indirect operator (SEL key), the digital mixer further includes an operating mode selector (SET_BY_SEL button 230) for selecting an ON/OFF state of a specific operating mode (SET_BY_SEL mode), and a channel selector for selecting a channel that allows setting of a value of a parameter (parameter safe flag SPF (i,j)) associated with the specific parameter (recall safe flag SEF (i)) based on an operating state of the indirect operator (SEL key), and the parameter setter (SP10, SP72) sets the value of the specific parameter (recall safe flag SEF (i)) based on the operating state of the indirect operator (SEL key), provided that the operating mode is ON (SET_BY_SEL mode).

Further, the display controller (18) allows a parameter display portion (232, 241-249, 341-349), together with the panel imitation portion (211-219), to be displayed on the display (2), the parameter display portion (232, 241-249, 341-349) displaying a set parameter as the specific parameter, and the digital mixer further includes an operator displayer (SP11, SP74) that allows a value of a parameter set by the parameter setter (SP10, SP72) to be reflected in an external appearance state (lit or unlit state) of each indirect operator.

What is claimed is:

1. A digital mixer having an operating panel, comprising:

a storage that stores operating data which consists of a plurality of parameters for controlling audio signal processing in a plurality of channels;

a signal processor that performs a mixing process of the audio signals based on the operating data in the storage;

a display device;

a plurality of panel sections disposed on the operating panel, each of the panel sections including a plurality of channel strips and each of the channel strips includes including controls for controlling one or more parameters of a corresponding channel in the storage;

a display controller that controls the display device to display a miniature image of the operating panel, imitating the appearance of the operating panel, on which all channel strips in all panel sections are figured in simplified shape as a plurality of panel section images including a plurality of channel strip images with the same positional relationship as the panel sections and the channel strips on the operating panel;

a parameter setter that, upon detecting manipulation of a specific control in one of the channel strips by an operator, sets a value of a specific parameter of the channel corresponding to the one of the channel strips in the storage; and a display appearance setter that changes the appearance of each channel strip image according to the value of the specific parameter of the corresponding channel in the storage.

2. The digital mixer according to claim 1, wherein the channel strips in the panel sections are fixed channel strips to which specified channels are fixedly assigned and an assignable panel section including assignable channel strips to which selected channels are temporarily assigned;

the plurality of the channels consist of the first group of the channels fixedly assigned to the fixed channel strips and the second group of channels corresponding to two or more layers and selectively assigned only to assignable channel strips in units of the layers; and the miniature image of the operating panel further includes two or more panel section images of the second group of channel strips arranged vertically in units of the layers in the same positional relationship as the assignable channel strip on the operating panel.

3. The digital mixer according to claim 1, wherein:

the controls other than the specific control in each of the channel strips are direct controls that influence the parameters of a corresponding channel immediately as the direct control is operated by the operator;

wherein the digital mixer further includes:

an operating mode selector for switching a specific operation mode on and off; and wherein the parameter setter sets the value of the specific parameter upon detecting the manipulation of the specific control by the operator, provided that the specific operating mode is on.

4. The digital mixer according to claim 3, wherein the digital mixer further includes:

a parameter operation portion disposed on the operating panel;

a channel selector for, upon detecting manipulation of the specific control in one of the channel strips by the operator while the specific operation mode is off, selecting a channel corresponding to the one of the channel strips; and a channel parameter setter that, upon detecting manipulation of the parameter operation portion by the operator, adjusts the parameters of the selected channel.

5. The digital mixer according to claim 4, wherein the digital mixer further includes a control display controller that reflects a value of the specific parameter set by the parameter setter in the appearance of the specific control in each channel strip.

6. The digital mixer according to claim 1, wherein the display controller controls the display device to display the miniature image which is a contracted image of the operating panel scaled down in a horizontal direction and a vertical direction of the operating panel.

7. The digital mixer according to claim 1, wherein the plurality of panel sections are disposed on the operating panel in two or more rows which separate from each other in a vertical direction of the operating panel, and wherein the plurality of panel section images are also arranged in the miniature image in two or more rows which separate from each other in the vertical direction.

8. The digital mixer according to claim 1, wherein the parameter setter, upon detecting on off manipulation of the specific control, sets an on off value of the specific parameter in correspondence to the on off manipulation of the specific control.

9. A non-transitory machine medium for use in a digital mixer which comprises:

an operating panel;

a storage that stores operating data which consists of a plurality of parameters for controlling audio signal processing in a plurality of channels;

a signal processor that performs a mixing process of the audio signals based on the operating data in the storage;

a display device;

a plurality of panel sections disposed on the operating panel, each of the panel sections including a plurality of channel strips and each of the channel strips including controls for controlling one or more parameters of a corresponding channel in the storage; and a controller that controls the storage, the signal processor and the channel strips, the medium containing a program which makes the controller perform:

a display control process that controls the display device to display a miniature image of the operating panel, imitating the appearance of the operating panel, on which all channel strips in all panel sections are figured in simplified shape as a plurality of panel section images including a plurality of channel strip images with the same positional relationship as the panel sections and the channel strips on the operating panel;

a parameter setting process that, upon detecting manipulation of a specific control in one of the channel strips by an operator, sets a value of a specific parameter of the channel corresponding to the one of the channel strips in the storage; and a display appearance setting process that changes the appearance of each channel strip image according to the value of the specific parameter of the corresponding channel in the storage.

* * * * *